United States Patent

Weineck et al.

[11] 4,088,916
[45] May 9, 1978

[54] PIEZOELECTRIC PRESSURE PICKUP

[75] Inventors: Hans Weineck, Ettlingen; Albert Maringer, Karlsruhe, both of Germany

[73] Assignee: Siemens Aktiengesellschaft, Munich, Germany

[21] Appl. No.: 715,850

[22] Filed: Aug. 19, 1976

[30] Foreign Application Priority Data

Aug. 28, 1975 Germany .............................. 2538381

[51] Int. Cl.² .......................................... H01L 41/10
[52] U.S. Cl. ................................................ 310/338
[58] Field of Search ................... 310/8.3, 8.7, 9.1, 9.4, 310/338, 328, 330; 73/117.2, 398 R, DIG. 4

[56] References Cited

U.S. PATENT DOCUMENTS

| 3,580,092 | 5/1971 | Scarpa | 310/9.1 X |
| 3,771,117 | 11/1973 | Shaffer et al. | 310/9.1 X |
| 3,890,423 | 6/1975 | Zacharias, Jr. | 310/9.1 X |
| 3,925,692 | 12/1975 | Leschek et al. | 310/9.1 X |
| 3,942,049 | 3/1976 | Hyanova et al. | 310/8.7 X |

*Primary Examiner*—Mark O. Budd
*Attorney, Agent, or Firm*—Kenyon & Kenyon, Reilly, Carr & Chapin

[57] ABSTRACT

To provide a piezoelectric pressure pickup for a fuel injection line, a piezoelectric ceramic plate is mounted between two pressure plates within a pipe clamp which is clamped around the fuel line and has a low coefficient of expansion compared to that of the injection line. One side of the piezoceramic plate is acted upon through one of its pressure plates by a force transmission element and is braced on the other side with a leaf spring which is compressed by means of a pressure screw.

5 Claims, 3 Drawing Figures

PIEZOELECTRIC PRESSURE PICKUP

BACKGROUND OF THE INVENTION

This invention relates to piezoelectric pressure pickups for fuel injection lines in internal combustion engines in general and more particularly to an improved pickup which is easier to install than those previously used in the art.

In particular for the diagnosis of Diesel engines, the exact determination of the beginning of injection is of as great an importance as is the determination of the instance of ignition in externally fired internal combustion engines. This is true whether it is done to correlate events in the individual cylinders with the correct cylinder or to correlate the injection process of the individual cylinders with a given piston position of the respective cylinder.

A diagnostic device for Diesel engines is described in U.S. Pat. No. 3,503,255. In the device disclosed therein, quartz pickups are used for measuring the pressures in injection lines. Other than indicating that such pressure pickups are used, this patent teaches nothing further as to the nature of the pressure pickups.

In German Offenlegungsschrift No. 21 10 107, a device for analyzing a fuel flow in which a sensor for the fuel flow is built into the fuel line is described. A similar device for measuring pressures in injection lines is described in German Offenlegungsschrift No. 21 43 476. In the device described therein an appropriate sensor is inserted into the fuel pressure system as a separate adaptor after the fuel line is unscrewed. These known pressure sensors require a considerable amount of time for installation when diagnosis is required. Furthermore, they change the cross section and/or the length of the fuel line, factors which are important for the shape of the pressure rise and therefore for the instant of the injection.

Thus, the need for an improved pressure pickup for use in measuring the pressure in injection lines in an internal combustion engine is evident.

SUMMARY OF THE INVENTION

It is the object of the present invention to provide a pressure pickup of the general type described above which can be installed without requiring an excessive amount of time and which does not influence the fuel flow in the injection line. Preferably, it should be a device which can be attached externally on the line.

In accordance with the present invention, this object is achieved through a pressure pickup which is mounted to the fuel line by means of a pipe clamp. The pipe clamp is made up of first and second parts. The first part includes a groove for accepting the fuel injection line and the second part, which can be bolted to the first part, has means to accommodate a force transmission body to transmit pressure pulsations to a small piezoceramic plate mounted between two pressure plates and braced by means of a leaf spring compressed against a knurled screw.

Through the present invention utilizing a pipe clamp which can be externally clamped to the fuel line, the internal combustion engine can be prepared for diagnosis in a short time and the installation of the sensor does not change the injection lines from their condition during normal operation.

In the device of the present invention a punctiform transmission of the expansion force occuring in the wall of the line is made possible through the use of a force transmission body having a contact surface with convex curvature. This permits the use of a very small piezoceramic plate which is affected only minimally by other interferring forces or vibrations of the engine. In accordance with the illustrated embodiment, a body having a spherically curved surface is used to provide the convex curvature relative to the fuel line. As illustrated, in the simplest case the body is a sphere or a pin with a contact surface in the shape of a spherical segment. Alternatively, a roller may be used as a force transmission body. It is preferred that the diameter of the force transmission body be approximately as large as the diameter of the fuel injection line. It is furthermore advisable that the thickness of the pipe support and the first part of the pipe clamp be several times the wall thickness of the fuel line. Furthermore, the spring constant of the leaf spring is chosen so that the resonance frequency of the vibrating system consisting of the force transmission body, the piezoceramic plate, the pressure plate and the leaf spring is outside the frequency range of the pressure pulsations of the fuel injection line. In order to avoid a permanent deformation of fuel injection line because of the force transmission body, it is also advisable to provide a hardened shell matched to the line diameter and place it between the fuel injection line and the force transmission body.

DETAILED DESCRIPTION OF THE INVENTION

Figure 1:
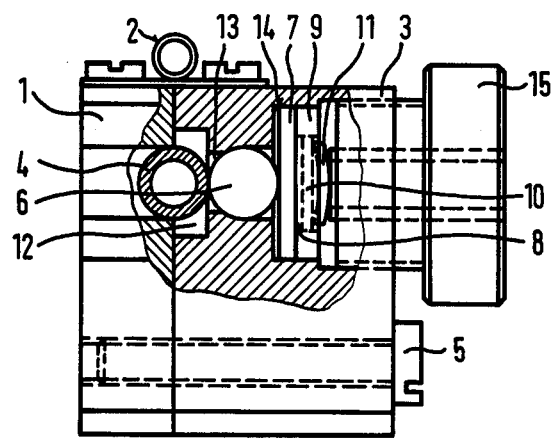
FIG. 1 is a plan view, partially in cross section, of a device according to the present invention.

FIG. 1 illustrates a pipe clamp which is made up of a first part 1 and a second part 3. The two parts are hinged together about a hinge 2. The first part 1 is grooved so as to accept a fuel line 4. The hinge 2 permits swinging the parts 1 and 3 apart so that the device of the present invention can be placed on and removed from the fuel line 4. When installed, a bolt 5 is used to hold the parts firmly together. The second part 3 has a recess 12 opposite the groove in the first part 1 having a cross section which is large enough so as to not squeeze the fuel injection line 4 when the clamp is closed. This recess 12 is continued as a hole 13 in which there is disposed, free to move therein, a spherical force transmission body 6. The total length of the hole 13 is somewhat shorter than the diameter of the force transmission body 6. Following the hole 13 there is somewhat more enlarged bore 14 in the part 3. In this bore 14 there are loosely placed a first pressure plate 7, a small piezoceramic plate 8 and a second pressure plate 10. The first pressure plate 7 is circular and the piezoceramic plate 8 is square. For insulation and centering, the piezoceramic plate 8 is surrounded by a setting of insulating plastic 9. The second pressure plate 10 has a dimension equal to that of the piezoceramic plate 8. A leaf spring 11 rests against this pressure plate 10 and is compressed by means of knurled screw 15 which screws into a suitable threaded opening in the part 3. By means of the knurled screw 15, the piezoceramic plate 8 and the pressure plates 7 and 10 enclosing it along with the force transmission element 6 are pressed by means of the leaf spring 11 against the outer wall of the fuel injection line 4. The knurled screw 15 contains a central hole 17 through which a contacting means, not shown, can be inserted to make contact with the leaf spring 11 and thereby to be in conductive connection with the upper side of the ceramic plate 8. The underside of the ceramic plate is connected to ground through its contact with the pressure plate 7. In this compressed position, pulsations of the fuel line 4 are transmitted by means of the force transmission body 6 through the pressure plate 7 to the piezoceramic plate 8 where these pulsations are converted to voltages which can then be taken off the plate and fed to an appropriate evaluating means, not shown in the drawing.

Figure 2:
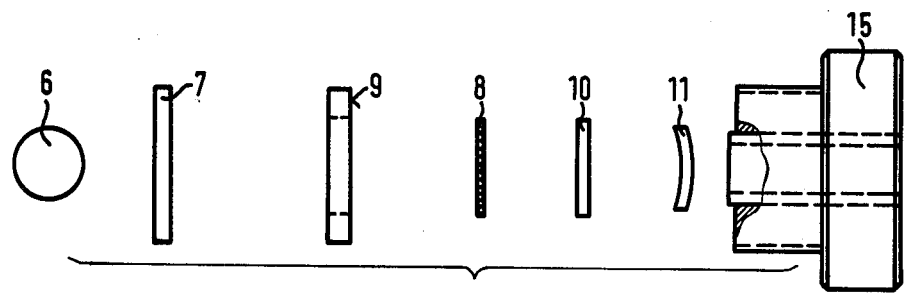
FIG. 2 is an exploded view showing various parts of FIG. 1.
Figure 3:
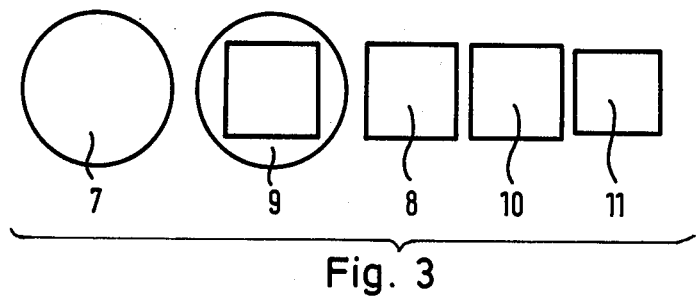
FIG. 3 is a plan view of a number of the parts shown on FIG. 2.

FIG. 2 is an expaned view of various elements of FIG. 1 with FIG. 3 being a plan view of the same elements. Shown is the sphereical force transmission member 6, the circular pressure plate 7 the plastic insulating means 9 containing an appropriate square cutout to accept the piezoceramic plate 8 and the second pressure plate 10 and finally the leaf spring 11 and knurled screw 15 with the hole for inserting an electrical contacting means. The knurled screw 15 preferably is made of plastic with an inserted metal tube. With such a construction, the metal tube contacting the leaf spring will make contact with the upper side of the piezoceramic plate and thus a connection need simply be made to the metal insert.

As noted above, in order to prevent deformation of the fuel injection line, it can be provided with a hard shell surrounding it.

We claim:

1. A piezoelectric pressure pickup for measuring pressure in a fuel injection line on an internal combustion engine comprising a two piece pipe clamp including a first member and a second member arranged to surround the fuel injection line, said first member having a groove for accepting the fuel injection line; a force transmission body in the form of a sphere for transmitting pressure pulsations of the fuel injection line; a first pressure plate; a piezoceramic plate; a second pressure plate; a leaf spring; a knurled screw; said force transmission body, said pressure plate, said piezoceramic plate, said second pressure plate, said leaf spring, and said knurled screw being arranged in that order, in abutting relationship with each other, with said leaf spring compressed, within a recess in the second part of said pipe clamp.

2. Apparatus according to claim 1 wherein said force transmission body has a diameter approximately equal to that of the fuel injection line with which it is used.

3. Apparatus according to claim 1 wherein the thicknesses of said first and second parts of said pipe clamp are several times the wall thickness of said fuel injection line.

4. Apparatus according to claim 1 wherein the spring constant of said leaf spring is such that the resonant frequency of the vibrating system consisting of said force transmission body, said first and second pressure plates, said piezoceramic plate and said leaf spring is outside the frequency range of the pressure pulsations of the fuel injection line.

5. Apparatus according to claim 1 and further including a hardened shell, matched to the diameter of said fuel injection line disposed between said fuel injection line and said force transmission body.

* * * * *